(12) United States Patent
Shinn

(10) Patent No.: US 7,213,623 B2
(45) Date of Patent: May 8, 2007

(54) STUMP CUTTING DEVICE WITH LOAD-DISTRIBUTING TOOTH SOCKETS

(76) Inventor: Rickey D. Shinn, 13915 Hastings Farm Rd., Huntersville, NC (US) 28078

( * ) Notice: Subject to any disclaimer, the term of this patent is extended or adjusted under 35 U.S.C. 154(b) by 62 days.

(21) Appl. No.: 10/760,567

(22) Filed: Jan. 20, 2004

(65) Prior Publication Data

US 2005/0166997 A1    Aug. 4, 2005

(51) Int. Cl.
  *A01G 23/06* (2006.01)
  *B27M 3/00* (2006.01)
(52) U.S. Cl. .................. 144/24.12; 144/218; 144/235; 144/241; 407/46
(58) Field of Classification Search ................ 144/241, 144/218, 235, 24.12, 334; 83/840, 839, 676; 407/46, 48
See application file for complete search history.

(56) References Cited

U.S. PATENT DOCUMENTS

| | | | | |
|---|---|---|---|---|
| 2,645,003 A | * | 7/1953 | Stanley et al. | 407/46 |
| 3,217,384 A | * | 11/1965 | Wirfelt | 407/36 |
| 3,405,433 A | * | 10/1968 | Williams | 407/40 |
| 3,660,879 A | * | 5/1972 | Erkfritz | 407/41 |
| 3,785,417 A | * | 1/1974 | Vora | 144/221 |
| 4,364,693 A | * | 12/1982 | Lindsay | 407/104 |
| 5,623,979 A | | 4/1997 | Bowling | |
| RE36,659 E | * | 4/2000 | Toogood | 144/220 |
| 6,203,251 B1 | * | 3/2001 | Oppelt et al. | 407/48 |

FOREIGN PATENT DOCUMENTS

| | | |
|---|---|---|
| CA | 2056999 | 12/1990 |
| GB | 2005170 A * | 4/1979 |

* cited by examiner

*Primary Examiner*—Bena Miller
(74) *Attorney, Agent, or Firm*—Schwartz Law Firm P.C.

(57) ABSTRACT

A cutting device includes a rotatable base defining a plurality of closed-sided, tooth sockets. A plurality of tooth assemblies are mounted within respective sockets. Each tooth assembly includes a tooth holder having a base-engaging portion adapted to fit into the socket, and a cutting tip projecting from the rotatable base for engaging and cutting an object.

15 Claims, 6 Drawing Sheets

STUMP CUTTING DEVICE WITH LOAD-DISTRIBUTING TOOTH SOCKETS

Technical Field and Background of the Invention

This invention relates generally to rotatable cutting devices, and more specifically to a tree stump cutting device with integral load-distributing tooth sockets for receiving and securing replaceable cutting teeth. The invention may be incorporated in a variety of stump grinders, such as relatively small handlebar units, common tow behind cutters, or larger self-propelled vehicles.

According to one prior art device described in U.S. Pat. No. 5,623,979, the cutting teeth are attached in matching pairs on opposite sides of a vertical, rotating disk or wheel. Each tooth has an enlarged mounting base and an integrally-formed, outwardly curved cutting tip. The teeth in each pair are mirror-oriented, and secured by two spaced-apart threaded retaining bolts. The retaining bolts extend from opposite sides of the disk and into respective tap holes formed in the mounting bases. The retaining bolts hold the mounting bases directly against the generally flat opposing major surfaces of the disk. During operation of the stump cutting device, substantial torque and shear forces are applied to the teeth and mounting bases as the cutting tips strike the stump. In the prior art device, the mounting bases are held against the rotating disk entirely by the shear strength of the retaining bolts. As the cutting tips engage and penetrate the stump, the striking force is transferred directly from the teeth, to the mounting bases, and then to the retaining bolts. The retaining bolts are the critical link regarding torque loading of the tooth assembly. With increasing torque loads, the bolts begin to deform or oblong the holes in the disk, and eventually break. The tooth sockets of the present invention address this problem by distributing the load of cutting from the tooth, to the base or holder, and then to the disk, thereby substantially eliminating stress on the bolts.

SUMMARY OF INVENTION

Therefore, it is an object of the invention to provide a stump cutting device which includes load-distributing tooth sockets which operate to transfer the striking force of the cutting teeth to the disk.

It is another object of the invention to relieve stress on the retaining bolts used to hold the tooth assemblies to the rotating disk.

It is another object of the invention to provide a cutting device with integral tooth sockets which receive and engage the base or holder of the tooth assembly on all sides.

These and other objects of the present invention are achieved in the preferred embodiments disclosed below by providing an novel, improved cutting device. The cutting device includes a rotatable base. The base defines a plurality of closed-sided, tooth sockets. A plurality of tooth assemblies are mounted within respective sockets. Each tooth assembly includes a tooth holder having a base-engaging portion adapted to fit into the socket, and a cutting tip projecting from the rotatable base for engaging and cutting an object.

According to another preferred embodiment of the invention, the tooth socket defines a recessed box having a generally flat bottom and four upright sides. Alternatively, the tooth socket may define a cylindrical recess adapted for receiving a complementary-shaped base of the tooth holder.

According to another preferred embodiment of the invention, the base-engaging portion of the tooth holder fits closely adjacent all four sides of the socket. The term "closely adjacent" means that the base-engaging portion resides within ¼ inches from each side of the socket, and preferably, within 1/32 inches from each side of the socket.

According to another preferred embodiment of the invention, the recessed box is substantially rectangular.

According to another preferred embodiment of the invention, the recessed box has a length dimension and a width dimension. The length dimension is preferably greater than 2 times the width dimension.

According to another preferred embodiment of the invention, the depth of the tooth socket is greater than 1/16 inches.

According to another preferred embodiment of the invention, the cutting tip, tooth holder, and socket define respective axially-aligned openings adapted for receiving an elongated fastener for securing the cutting tip and tooth holder to the rotatable base.

In another embodiment, the invention is a cutting device including a rotatable disk having first and second opposing major surfaces. The disk defines a plurality of closed-sided, tooth sockets formed with each of the first and second major surfaces. A plurality of tooth assemblies are mounted within respective sockets. Each tooth assembly includes a tooth holder having a disk-engaging portion adapted to fit into the socket, and a cutting tip projecting from the rotatable base for engaging and cutting an object.

According to another preferred embodiment of the invention, the tooth sockets are arranged to receive respective tooth assemblies in matched pairs on opposing major surfaces of the rotatable disk.

According to another preferred embodiment of the invention, the cutting tip and tooth holder of each matched pair of tooth assemblies and the corresponding tooth sockets define respective axially-aligned openings. The axially-aligned openings are adapted for receiving an elongated fastener for securing the cutting tip and tooth holder.

In yet another embodiment, the invention is a rotatable cutting disk having first and second opposing major surfaces. The disk defines a plurality of closed-sided, tooth sockets formed with each of the first and second major surfaces. The tooth sockets are adapted for receiving respective tooth assemblies applicable for engaging and cutting an object.

BRIEF DESCRIPTION OF THE DRAWINGS

Some of the objects of the invention have been set forth above. Other objects and advantages of the invention will appear as the description proceeds when taken in conjunction with the following drawings, in which.

DESCRIPTION OF THE PREFERRED EMBODIMENT AND BEST MODE

Figure 1:
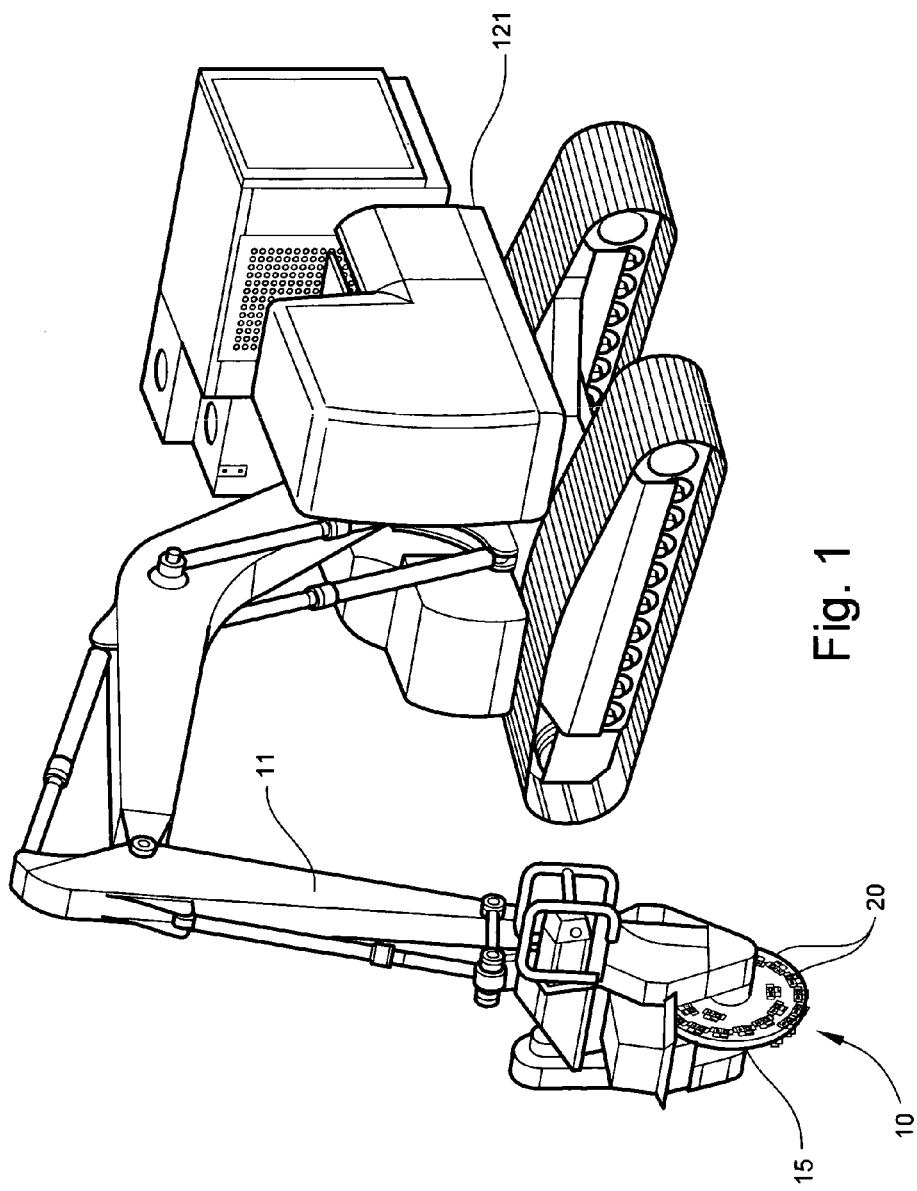
FIG. 1 is an environmental perspective view of the stump cutting device according to one preferred embodiment of the present invention.

Referring now specifically to the drawings, a cutting device according to the present invention is illustrated in FIG. 1, and shown generally at reference numeral 10. The cutting device 10 is rotatably mounted on the movable working element 11 of a self-propelled vehicle 12, such as a commercial CAT excavator or tractor, and is particularly applicable for cutting and grinding tree stumps. In the embodiment shown, the cutting device 10 is powered by a 425-horsepower hydraulic engine with a polychain belt drive applicable for rotating the device at speeds up to 900 RPM, and including up to 20,000 inch-pounds of output torque.

Figure 2:
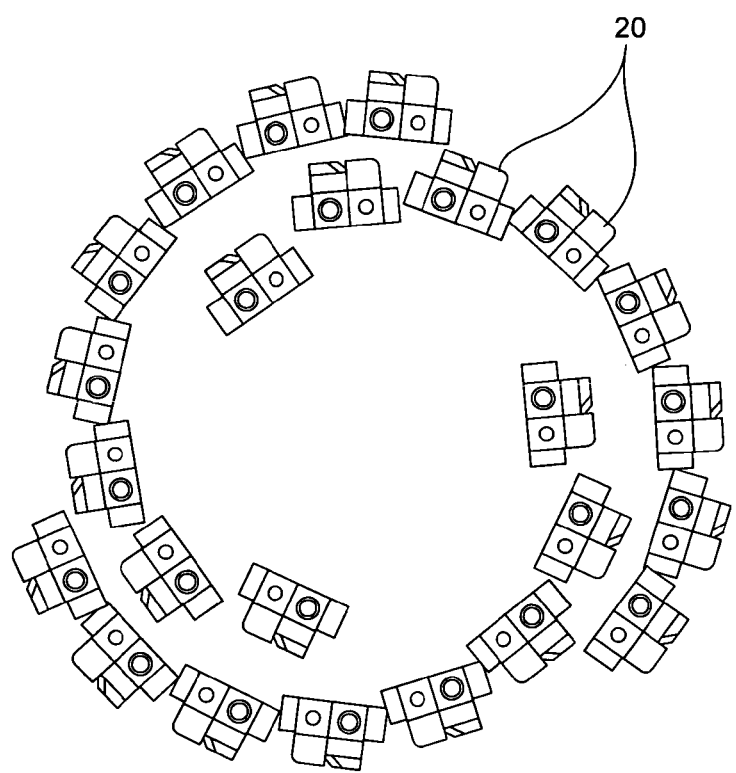
FIG. 2 is a side view illustrating the arrangement of tooth assemblies on each major surface of the cutting disk (not shown)
Figure 3:
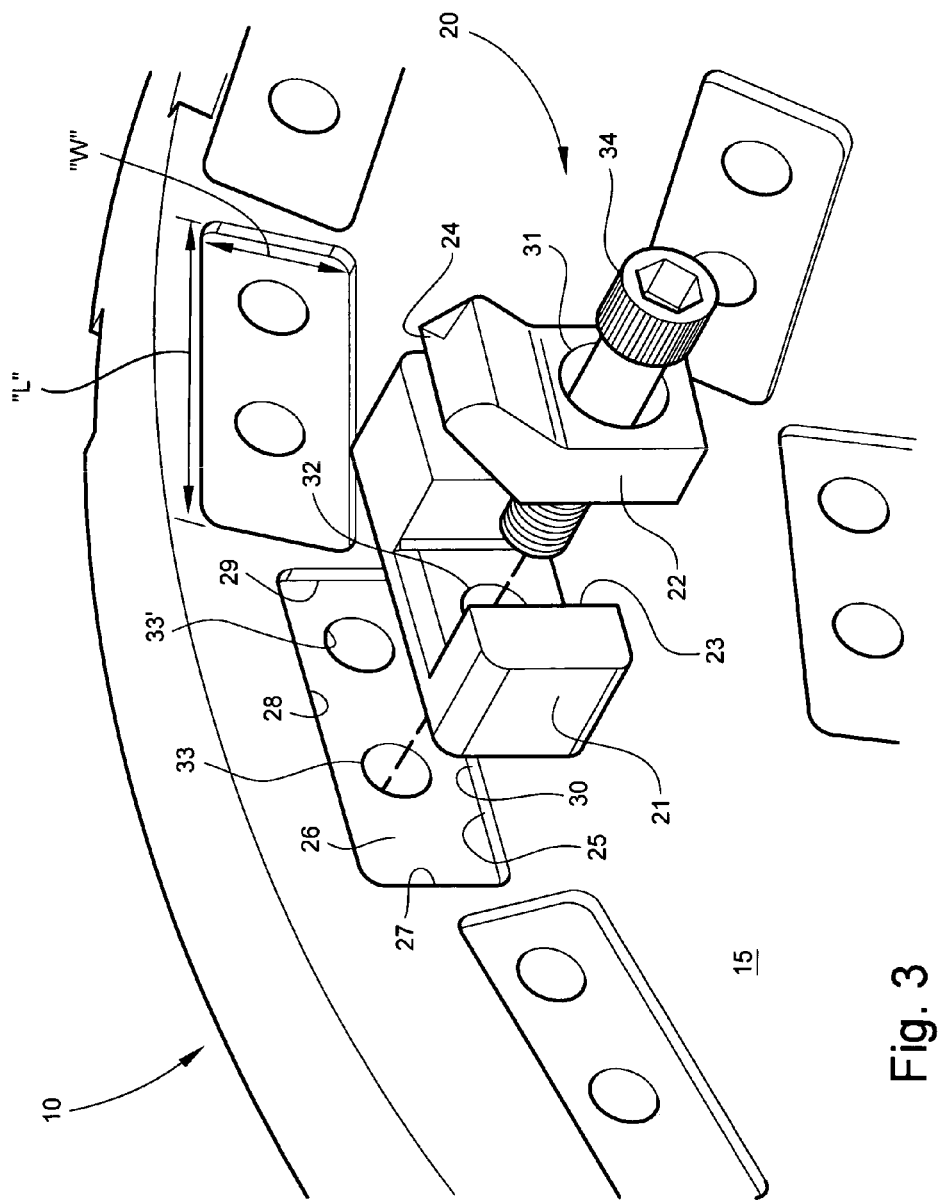
FIG. 3 is an exploded view of the tooth assembly with the tooth holder removed from the tooth socket formed with the cutting disk.

The cutting device 10 comprises a vertical cutting disk 15 with a number of interchangeable and replaceable tooth assemblies 20 attached in matching pairs to respective opposite sides (or major surfaces) of the disk 15. The tooth assemblies 20 are preferably arranged, as indicated in FIG. 2. As best shown in FIG. 3, each tooth assembly 20 includes a separate tooth holder 21 and cutting tooth 22. The cutting tooth 22 fits tightly within a channel 23 defined by the holder 21, and has an outwardly-projecting cutting tip 24 which angles away from the surface of the disk 15. The cutting tips 24 of the outermost assemblies 20 extend radially beyond the periphery of the disk 15. The holder 21 is shaped to fit closely within a closed-sided tooth socket 25 formed with the cutting disk 15. According to one embodiment, the tooth socket 25 defines a recessed box having a generally flat bottom 26 and four upright sides 27, 28, 29, and 30. The length "L" of the tooth socket 25 is at least two times its width "W" with the depth being at least ¹⁄₁₆ inches. The upright sides 27–30 of the socket 25 cooperate to secure the tooth assembly 20, and provide substantial torque and shear resistance during high-speed rotation of the cutting device 10. The disk-engaging portion of the holder 21 is generally rectangular, and sized to fit less than ¹⁄₃₂ inches from each side 27–30 of the socket 25.

Figure 4:
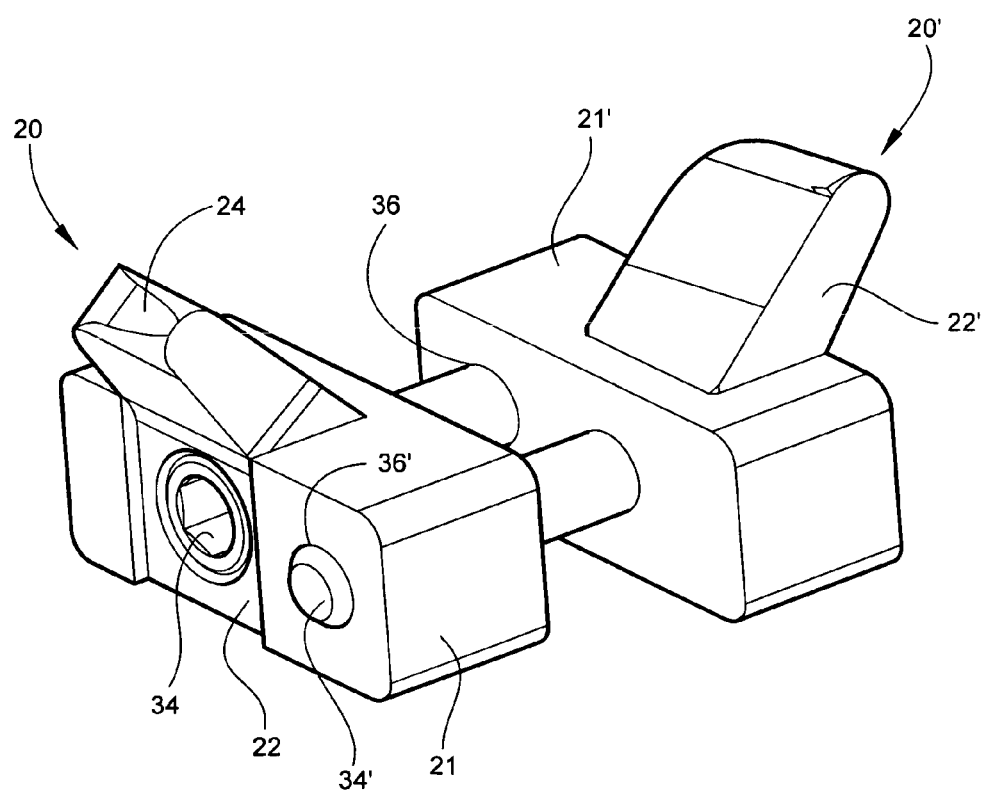
FIG. 4 is a perspective view of matching tooth assemblies mirror-oriented, and held together by threaded retaining bolts—the tooth assemblies adapted for residing on opposite sides of the cutting disk.
Figure 5:
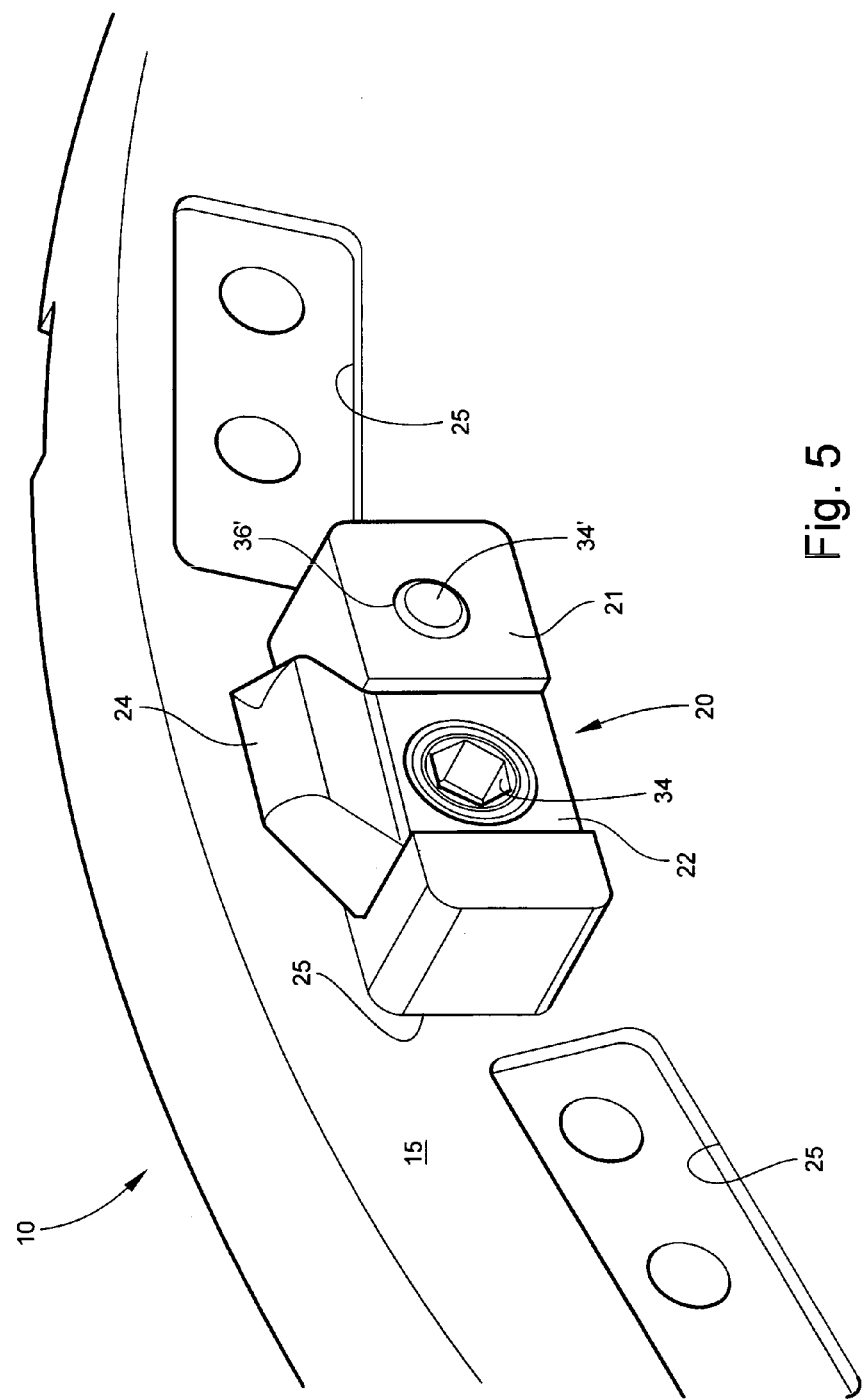
FIG. 5 is a view of the tooth assembly mounted within the tooth socket of the cutting disk.

As best illustrated in FIGS. 3 and 4, the cutting tooth 22, tooth holder 21, and socket 25 define respective axially-aligned openings 31, 32, and 33 which receive a threaded retaining bolt 34 designed to extend entirely through the cutting disk 15. The threaded, free end of the bolt 34 mates with a complementary-threaded opening 36 formed in the matching holder 21' located on the opposite side of the disk 15. The bolt 34' extends through the disk opening 33' and into a complementary threaded opening 36' formed with the holder 21. The cutting teeth 22 and 22' are mirror-oriented to balance the disk 15 and minimize vibration. The two bolts 34 and 34' in each matching pair of tooth assemblies 20 and 20' cooperate with the sockets 25 formed in the cutting disk 15 to effectively mount and secure each assembly 20, 20'. FIG. 5 shows the tooth assembly 20 located within the socket 25 and attached by bolts 34 and 34'. During operation of the cutting device 10, considerable force and contact stress is transferred from the cutting teeth 22, to the holders 21 and then to the disk 15—as opposed to the retaining bolts 34, 34'. The close fit of the disk-engaging portion of the tooth holder 21 within the socket 25 adjacent all four upright sides 27–30 of the socket 25 ensure that any twisting or rocking of the cutting tooth 22 and holder 21 is substantially absorbed by the disk 15.

Figure 6:
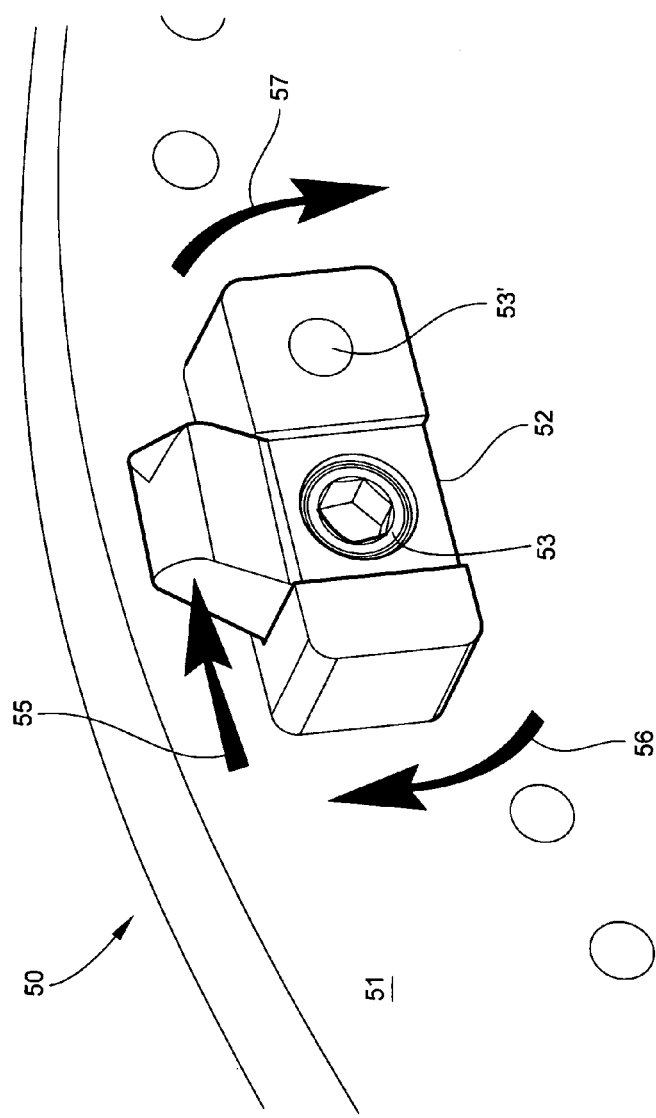
FIG. 6 is a view of a prior art cutting disk having generally flat major surfaces, and illustrating the forces applied to the tooth assembly upon operation of the cutting device.

FIG. 6 illustrates a cutting device 50 of the prior art. This device 50 incorporates a similar cutting disk 51 and tooth assembly 52. The tooth assembly 52 is held by retaining bolts 53, 53' directly against a relatively flat major surface of the cutting disk 51. The load applied to the tooth assembly 52 during operation of the cutting device 50 is indicated by arrow 55. Arrows 56 and 57 indicate the twisting force caused by the load. Without the load-distributing sockets of the present cutting device, this force is transferred entirely to the retaining bolts 53 and 53'. Over a relatively short period of use, the retaining bolts 53, 53' become worn, and will often deform or oblong the holes formed in the more expensive cutting disk 51.

A cutting device is described above. Various details of the invention may be changed without departing from its scope. Furthermore, the foregoing description of the preferred embodiment of the invention and best mode for practicing the invention are provided for the purpose of illustration only and not for the purpose of limitation—the invention being defined by the claims.

I claim:

1. A cutting device, comprising:
   (a) a rotatable base;
   (b) said base defining a plurality of closed-sided, tooth sockets, each closed-sided tooth socket comprising a bottom and plurality of adjacent raised sides;
   (c) a plurality of tooth assemblies mounted within respective sockets, each tooth assembly comprising a tooth holder, and a cutting tip projecting from said rotatable base for engaging and cutting an object, said tooth holder having a base-engaging portion residing within ¹⁄₃₂ inches from each of the raised sides of said closed-sided tooth socket, such that the raised sides cooperate to secure said tooth assembly and provide resistance during rotation of said cutting device.

2. A cutting device according to claim 1, wherein said tooth socket defines a recessed box comprising a generally flat bottom and four raised sides.

3. A cutting device according to claim 2, wherein the base-engaging portion of said tooth holder resides closely adjacent all four sides of said socket.

4. A cutting device according to claim 3, wherein said recessed box is substantially rectangular.

5. A cutting device according to claim 4, wherein said recessed box has a length dimension and a width dimension, said length dimension being greater than 2 times said width dimension.

6. A cutting device according to claim 5, wherein the depth of said tooth socket is greater than $\frac{1}{16}$ inches.

7. A cutting device according to claim 1, wherein said cutting tip, tooth holder, and socket define respective axially-aligned openings adapted for receiving an elongated fastener for securing said cutting tip and tooth holder to said rotatable base.

8. A cutting device, comprising:
   (a) a rotatable disk having first and second opposing major surfaces;
   (b) said disk defining a plurality of closed-sided, tooth sockets formed with each of said first and second major surfaces, each closed-sided tooth socket comprising a bottom and plurality of adjacent raised sides;
   (c) a plurality of tooth assemblies mounted within respective sockets, each tooth assembly comprising a tooth holder, and a cutting tip projecting from said rotatable base for engaging and cutting an object, said tooth holder having a base-engaging portion residing within $\frac{1}{32}$ inches from each of the raised sides of said *closed-sided* tooth *socket*, such that the raised sides cooperate to secure said tooth assembly and provide resistance during rotation of said cutting *device*.

9. A cutting device according to claim 8, wherein said tooth sockets are arranged to receive respective tooth assemblies in matched pairs on opposing major surfaces of said rotatable disk.

10. A cutting device according to claim 9, wherein said cutting tip and tooth holder of each matched pair of tooth assemblies and said corresponding tooth sockets define respective axially-aligned openings adapted for receiving an elongated fastener for securing said cutting tip and tooth holder of each matched pair to said rotatable disk.

11. A cutting device according to claim 8, wherein said tooth socket defines a recessed box comprising a generally flat bottom and four raised sides.

12. A cutting device according to claim 11, wherein the base-engaging portion of said tooth holder resides closely adjacent all four sides of said socket.

13. A cutting device according to claim 12, wherein said recessed box is substantially rectangular.

14. A cutting device according to claim 13, wherein said recessed box has a length dimension and a width dimension, said length dimension being greater than 2 times said width dimension.

15. A cutting device according to claim 14, wherein the depth of said tooth socket is greater than $\frac{1}{16}$ *inches*.

* * * * *